RANSOM & GRANGER.
Tea Kettle.
No. 31,767. Patented March 19, 1861.
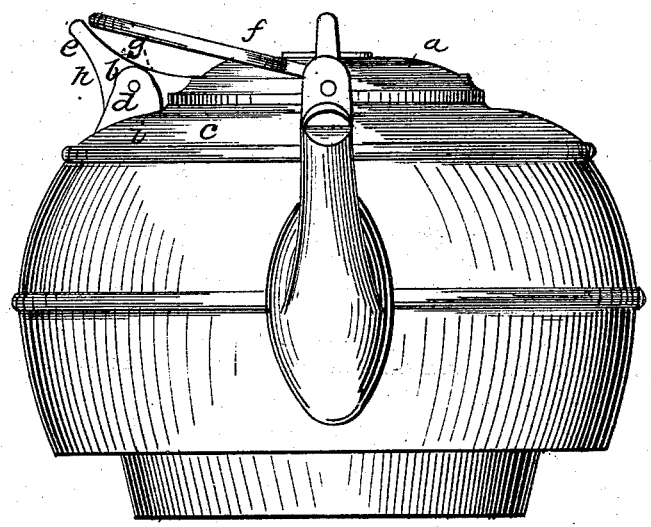
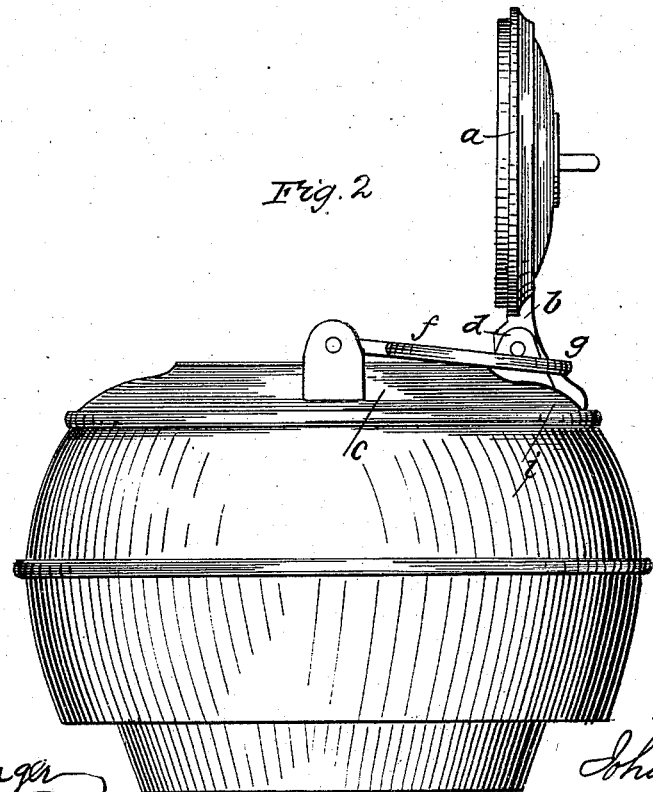
Witnesses.
R. D. Granger
Alvin Ransom
Inventors
John M. Barnes
Jas. A. Greig

U. S. PATENT OFFICE.

No. 763.     1861.     WHOLE No. 31,767.

Tea Kettles.

ALBION RANSOM & R. D. GRANGER, OF ALBANY, N. Y.,
ASSIGNORS TO S. H. RANSOM & CO., OF SAME PLACE.

Letters Patent No. 763, dated March 19, 1861.

SPECIFICATION.

TO ALL WHOM IT MAY CONCERN:

Be it known, that we, ALBION RANSOM and RENSSELAER D. GRANGER, of the city of Albany, and State of New York, have invented a certain new and useful improvement on Cast Iron Tea Kettles; and we do hereby declare the following is a full, clear, and exact description thereof, reference being had to the accompanying drawings, and to the letters and marks thereon.

The cast iron tea kettle, as heretofore generally constructed, had the lid or cover lying upon the edges or lips of the mouth, and without any means of being kept in position, and the bail or handle lying upon the breast or body of the kettle. When thus constructed, the lid is liable to slide or fall off and the bail to become heated, particularly when the kettle is used for the stove. The bail being heated, a holder would have to be used to prevent the hand being burnt; a holder would also have to be used to move the lid.

Now, our invention has for its object remedying these evils of the lid or cover and of the bail; and our invention consists in so attaching the lid to the body of the kettle, that it will not fall off, but that it may be turned to the one side, and when so turned, will remain in the open position, the turning off being accomplished by moving the bail; and in so placing the bail that it will not rest upon the breast or body of the kettle and become heated, but will be off from the body, and at all times cool enough to be safely handled.

The drawings forming part of this specification, show our invention applied to the stove tea kettle.

*Ransom and Granger's Improvement in Tea Kettles.*

Figure 1 of these drawings illustrating the position of the bail, when the lid is upon the mouth of the kettle; and Figure 2, the position of the bail and lid, when the mouth is uncovered and the lid in its sustained and elevated condition.

In carrying out our invention we cast the lid $a$, with a stud or projection $b$, and the body of the kettle $c$; also with a projection or eye $d$. A pin passed through holes in these projecting pieces serves to connect the lid and the body, and forms the turning point of the former upon the latter.

The piece $b$ of the lid, it will be noticed, extends upward in the character of a beak $e$, thus forming a rest for the bail $f$, when the lid is over the mouth. From this beak $e$ to the edge of the lid, the upper surface $g$ of this projection is curved, by virtue of which, when the bail is pressed downwards, the lid is elevated, and can be thrown fully back to the position shown in figure 2. The under surface of the projecting piece $b$ is likewise curved, $h$ the line of the curve being that of the breast $i$ of the kettle, so that, when the lid is elevated as shown by figure 2, it is supported in the erect, or nearly erect position.

What we claim as new in cast iron tea kettles is, connecting the lid or cover to the breast of the kettle by studs or projections constructed substantially as described, whereby the lid will be held to the body at all times, and be in the erect or nearly erect position when thrown up or out, and the bail be held off from the breast of the kettle, as herein recited.

ALBION RANSOM,
R. D. GRANGER.

Witnesses:
JOHN S. BARNES,
JAMES A. GREIG.